United States Patent
Melendez

(10) Patent No.: US 11,505,324 B2
(45) Date of Patent: Nov. 22, 2022

(54) METHODS AND SYSTEMS FOR CONTROLLING SUPERSONIC FLIGHT ENTRY/EXIT OF A VEHICLE

(71) Applicant: Honeywell International Inc., Morris Plains, NJ (US)

(72) Inventor: Luis Melendez, Scottsdale, AZ (US)

(73) Assignee: Honeywell International Inc., Charlotte, NC (US)

(*) Notice: Subject to any disclaimer, the term of this patent is extended or adjusted under 35 U.S.C. 154(b) by 306 days.

(21) Appl. No.: 16/863,751

(22) Filed: Apr. 30, 2020

(65) Prior Publication Data

US 2021/0339876 A1    Nov. 4, 2021

(51) Int. Cl.
*B64D 25/08* (2006.01)
*B64C 13/16* (2006.01)
*G08G 5/00* (2006.01)

(52) U.S. Cl.
CPC .............. *B64D 25/08* (2013.01); *B64C 13/16* (2013.01); *G08G 5/0039* (2013.01)

(58) Field of Classification Search
CPC ....... B64D 25/08; B64C 13/16; G08G 5/0039
USPC ......................................................... 244/203
See application file for complete search history.

(56) References Cited

U.S. PATENT DOCUMENTS

| | | |
|---|---|---|
| 3,870,253 A | 3/1975 | Leidy et al. |
| 5,571,953 A | 11/1996 | Wu |
| 6,913,228 B2* | 7/2005 | Lee .......................... B64C 30/00 701/1 |
| 8,078,345 B2* | 12/2011 | Botargues ............ G05D 1/0688 701/16 |
| 8,145,366 B1* | 3/2012 | Haering, Jr. ........... G01C 23/00 244/1 N |
| 9,199,724 B2* | 12/2015 | Pastor .................. G05D 1/0688 |
| 9,423,799 B1* | 8/2016 | Wu ....................... G08G 5/0021 |

(Continued)

OTHER PUBLICATIONS

Extended European Search Report dated Sep. 30, 2021 in European Application No. 21168968.2 (10 pages).

(Continued)

*Primary Examiner* — Peter D Nolan
*Assistant Examiner* — Luke Huynh
(74) *Attorney, Agent, or Firm* — Bookoff McAndrews PLLC

(57) ABSTRACT

Disclosed are methods, systems, and non-transitory computer-readable medium for supersonic flight entry/exit management. For instance, the method may include determining whether a transition between supersonic and subsonic flight is approaching; and in response to determining the transition between subsonic and supersonic flight is approaching, performing a supersonic flight entry/exit process. The supersonic flight entry/exit process may include: obtaining center of gravity (CG) information for the vehicle, drag information for the vehicle, and a planned trajectory of the vehicle (trajectory data); performing an analysis of the trajectory data to determine whether the planned trajectory is safe and consistent; based on a result of the analysis, adjusting the planned trajectory or confirming the planned trajectory of the vehicle; and based on the adjusted planned trajectory or the confirmed planned trajectory of the vehicle, generating actuator instructions to execute the adjusted planned trajectory or the confirmed planned trajectory.

20 Claims, 5 Drawing Sheets

(56) References Cited

U.S. PATENT DOCUMENTS 9,536,435 B1 * 1/2017 Shay .................... G05D 1/0005
2005/0051666 A1 3/2005 Lee et al.

OTHER PUBLICATIONS

Donald W. Richardson, "Practical considerations in commercial supersonic transport flight operations", Journal of Aircraft, vol. 2, No. 2, Mar. 1, 1965, pp. 66-71, XP855768288.

* cited by examiner

METHODS AND SYSTEMS FOR CONTROLLING SUPERSONIC FLIGHT ENTRY/EXIT OF A VEHICLE

TECHNICAL FIELD

Various embodiments of the present disclosure relate generally to methods and systems for a supersonic entry/exit monitor and, more particularly, to methods and systems for a supersonic entry/exit monitor that ensures safe and consistent transition between supersonic and subsonic flight.

BACKGROUND

Generally, supersonic flight may present several challenges. For instance, as a first example, supersonic flight may be limited by certification authorities (e.g., FAA), such as minimum/floor requirements that dictate a minimum altitude that a vehicle may cruise at supersonic or maximum mach speed (based on altitude) for a geographic region, etc. Therefore, determining suitable entry and exit locations into and out of transonic flight to or from supersonic flight may be one challenge. As a second example, supersonic flight for supersonic vehicles may be sensitive to center of gravity stability for the supersonic vehicles. Therefore, executing transition maneuvers into or out of supersonic flight, with sufficient space, may be a second challenge.

The present disclosure is directed to overcoming one or more of these above-referenced challenges.

SUMMARY OF THE DISCLOSURE

According to certain aspects of the disclosure, systems and methods are disclosed for a supersonic entry/exit monitor that ensures safe and consistent transition between supersonic and subsonic flight.

For instance, a method may include: obtaining a flight plan of a vehicle; monitoring progress of the vehicle through the flight plan to determine whether a transition between supersonic and subsonic flight is approaching; and in response to determining the transition between subsonic and supersonic flight is approaching, performing a supersonic flight entry/exit process. The supersonic flight entry/exit process may include: obtaining center of gravity (CG) information for the vehicle, drag information for the vehicle, and a planned trajectory of the vehicle; performing an analysis of the CG information, the drag information, and the planned trajectory to determine whether the planned trajectory has sufficient space and determine a suitable entry/exit point between supersonic and subsonic flight; based on a result of the analysis, adjusting the planned trajectory or confirming the planned trajectory of the vehicle; and based on the adjusted planned trajectory or the confirmed planned trajectory of the vehicle, generating actuator instructions to execute the adjusted planned trajectory or the confirmed planned trajectory.

A system may include a memory storing instructions; and a processor executing the instructions to perform a process. The process may include: obtaining a flight plan of a vehicle; monitoring progress of the vehicle through the flight plan to determine whether a transition between supersonic and subsonic flight is approaching; and in response to determining the transition between subsonic and supersonic flight is approaching, performing a supersonic flight entry/exit process. The supersonic flight entry/exit process may include: obtaining center of gravity (CG) information for the vehicle, drag information for the vehicle, and a planned trajectory of the vehicle; performing an analysis of the CG information, the drag information, and the planned trajectory to determine whether the planned trajectory has sufficient space and determine a suitable entry/exit point between supersonic and subsonic flight; based on a result of the analysis, adjusting the planned trajectory or confirming the planned trajectory of the vehicle; and based on the adjusted planned trajectory or the confirmed planned trajectory of the vehicle, generating actuator instructions to execute the adjusted planned trajectory or the confirmed planned trajectory.

A non-transitory computer-readable medium may store instructions that, when executed by a processor, cause the processor to perform a method. The method may include: obtaining a flight plan of a vehicle; monitoring progress of the vehicle through the flight plan to determine whether a transition between supersonic and subsonic flight is approaching; and in response to determining the transition between subsonic and supersonic flight is approaching, performing a supersonic flight entry/exit process. The supersonic flight entry/exit process may include: obtaining center of gravity (CG) information for the vehicle, drag information for the vehicle, and a planned trajectory of the vehicle; performing an analysis of the CG information, the drag information, and the planned trajectory to determine whether the planned trajectory has sufficient space and determine a suitable entry/exit point between supersonic and subsonic flight; based on a result of the analysis, adjusting the planned trajectory or confirming the planned trajectory of the vehicle; and based on the adjusted planned trajectory or the confirmed planned trajectory of the vehicle, generating actuator instructions to execute the adjusted planned trajectory or the confirmed planned trajectory.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to a supersonic entry/exit monitor.

In general, the present disclosure is directed to a supersonic entry/exit monitor on board a vehicle. The supersonic entry/exit monitor of the present disclosure (e.g., an autoflight system or fly-by-wire system) may execute a supersonic flight entry/exit process to ensure that the transition through transonic to supersonic or subsonic are safe and consistent. For instance, the supersonic entry/exit monitor of the present disclosure may compare a center of gravity locations (either current or predicted through points in a maneuver) to center of gravity thresholds; if the center of gravity locations are outside the center of gravity thresholds, then the supersonic entry/exit monitor may determine the maneuver does not have enough space to safely perform the maneuver, and cause the maneuver to be adjusted until it is safe. Moreover, the supersonic entry/exit monitor of the present disclosure may predict a course of the vehicle through the maneuver based on expected performance, dynamics, and conditions. Using the course, the supersonic entry/exit monitor of the present disclosure may determine an exit point of the maneuver based on the curve and the predicted ending point of the course; and determine whether the exit point (or, generally, any points of the curve) are within supersonic flight restrictions. If so, the supersonic entry/exit monitor of the present disclosure may adjust the maneuver; if not, the supersonic entry/exit monitor of the present disclosure may confirm the maneuver, and then execute actuator instruction to exit the confirmed maneuver. Therefore, the supersonic entry/exit monitor of the present disclosure may (1) determine suitable entry and exit locations into and out of transonic flight to or from supersonic flight and (2) ensure that execution of transition maneuvers into or out of supersonic flight occurs with sufficient space.

While this disclosure describes the systems and methods with reference to aircraft, it should be appreciated that the present systems and methods are applicable to management of vehicles, including those of drones, or any other autonomous flight vehicle, or spacecraft.

Figure 1:
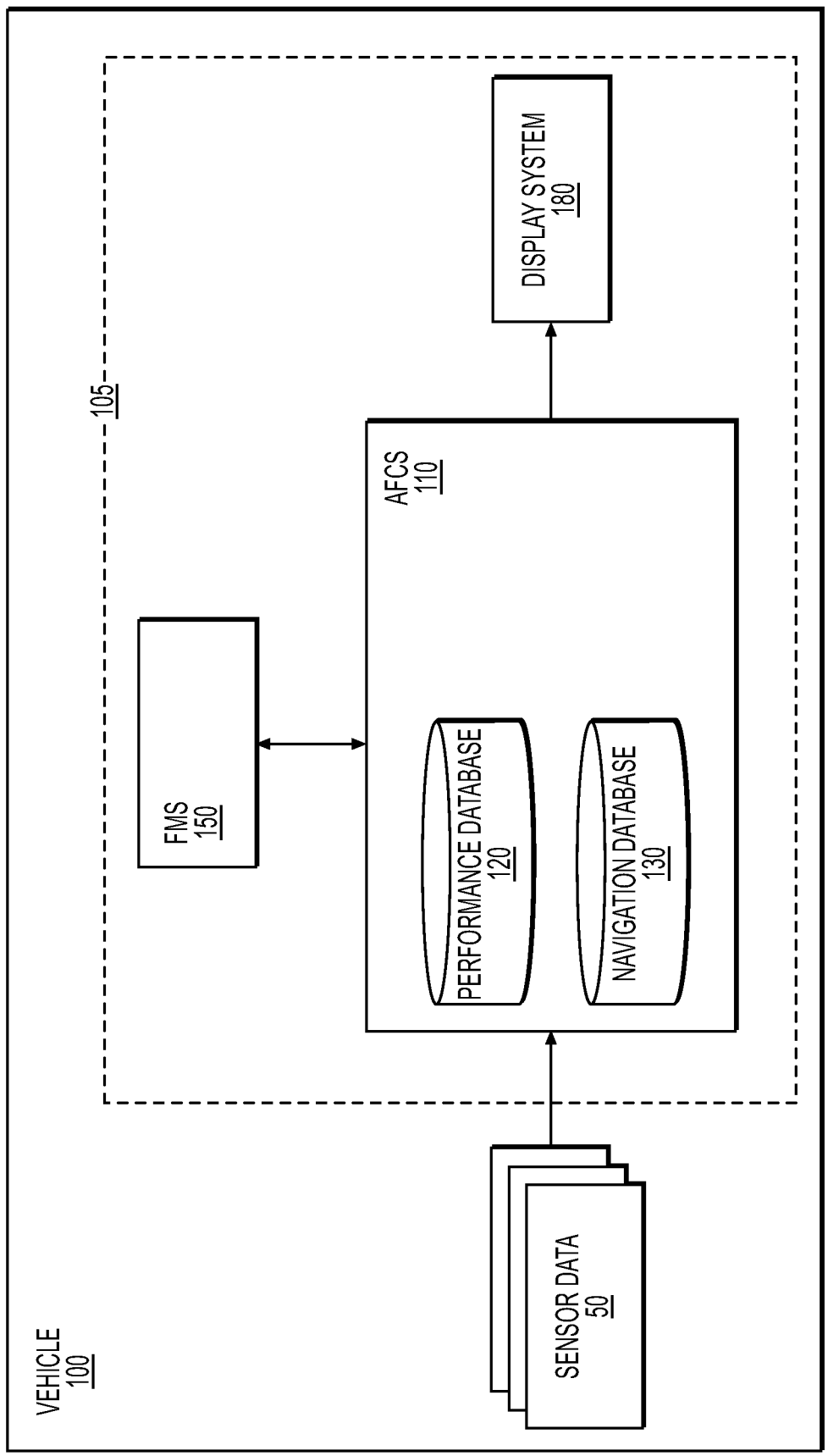
FIG. 1 depicts an exemplary block diagram of a system for a supersonic entry/exit monitor, according to one or more embodiments.
Figure 2:
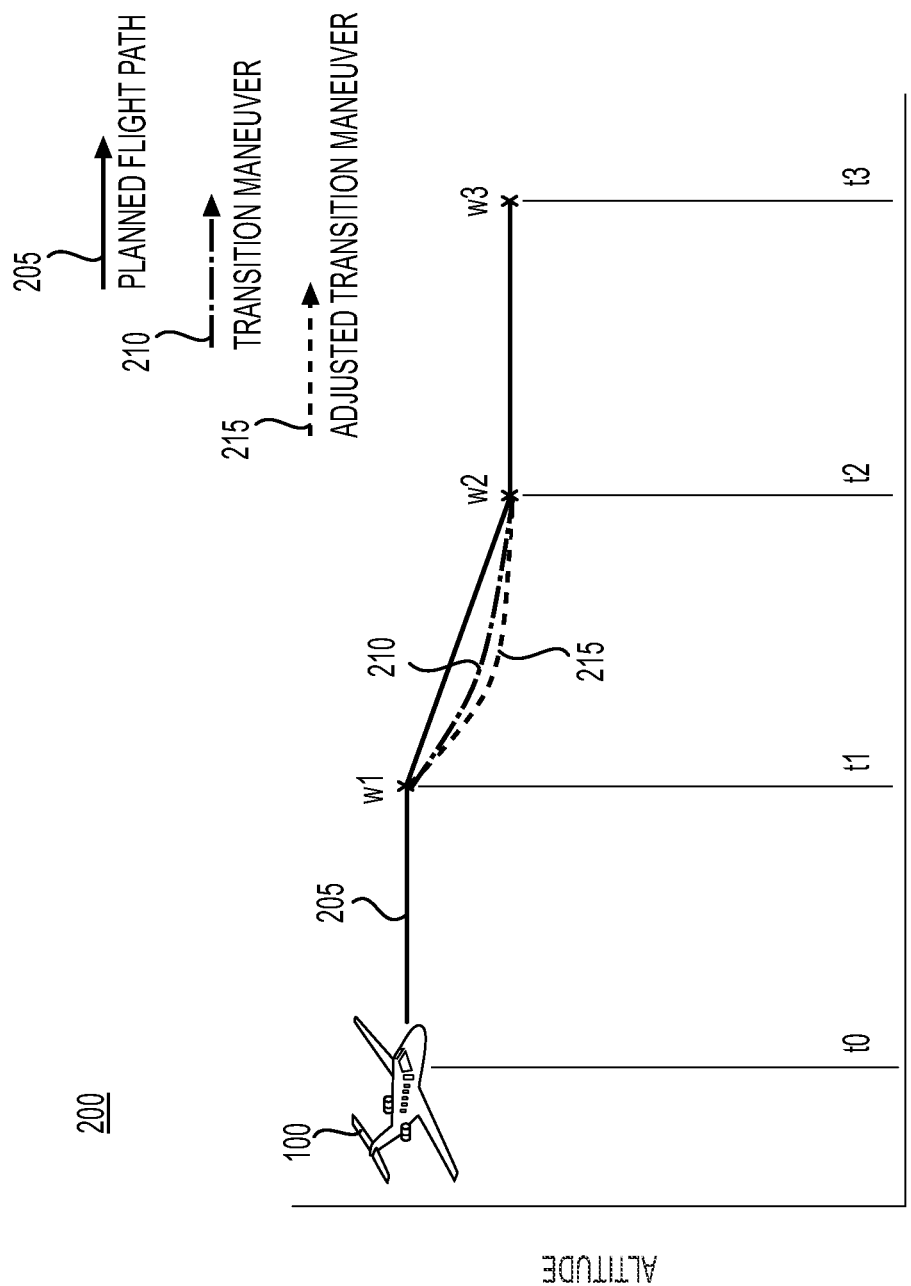
FIG. 2 depicts an exemplary system environment for a supersonic entry/exit monitor, according to one or more embodiments.

FIG. 1 depicts an exemplary block diagram of a system for a supersonic entry/exit monitor, according to one or more embodiments. FIG. 2 depicts an exemplary system environment 200 for a supersonic entry/exit monitor, according to one or more embodiments. The system may be a vehicle 100, such as a supersonic aircraft, that is operating in the exemplary system environment 200 of FIG. 2. However, the vehicle 100 may also be a supersonic drone (e.g., an un-maned aircraft), a rocket, or a spacecraft. The vehicle 100 may include an auto-throttle control system (AFCS) 110 (or, a fly-by-wire system), a flight management system (FMS) 150, and a display system 180 (or, generally, a user interface system). The AFCS 110, the FMS 150, and the display system 180 may be a part of a control system 105 of the vehicle 100, such as in a cockpit of an aircraft.

The FMS 150 may store a flight plan of the vehicle 100, and manage the flight plan of the vehicle 100, such as by user or system inputs. As depicted in FIG. 2, the flight plan may have a planned flight path 205 between various points (e.g., waypoints, such as waypoint w1, waypoint w2, and waypoint w3, at time t1, t2, and t3, respectfully). The flight plan may indicate that at waypoint w1 the vehicle 100 may transition from (1) supersonic to subsonic flight or (2) subsonic to supersonic flight (referred to herein as "transition point"). Notably, however, the flight plan may indicate a transition at a different point, other than a named waypoint, such as before or after waypoint w1. One of skill in the art would understand that flight plans may indicate transition points based on various criteria, such as restricted airspace, efficient use of fuel, weather conditions, etc. Furthermore, the flight plan may be updated before and/or during a flight of the vehicle 100, such as by pilot or system inputs to the FMS 150.

Furthermore, the flight plan may indicate that at waypoint w1, the vehicle 100 may start a transition maneuver 210 so that the vehicle 100 has safely transitioned (1) to supersonic flight or (2) to subsonic flight, before or at waypoint w2. The transition maneuver 210 may be one of a plurality of maneuvers programmed into the FMS 150 or the AFCS 110 (e.g., in the navigation database 130). The plurality of maneuvers may be designed based on circumstances (e.g., starting altitude, weather conditions, center of gravity (CG), etc.) for vehicle 100 (e.g., for all vehicles of a type similar or same as the vehicle 100). Generally, the plurality of maneuvers may be flight path curves that indicate an altitude, attitude, and/or speed, with respect to time, of the vehicle 100 through a maneuver. The plurality of maneuvers may be stored in the performance database 120, e.g., with identifiers.

The AFCS 110 may control actuation systems of the vehicle 100 to control the vehicle 100 along a flight path curve of a maneuver, such as the transition maneuver 210. The actuation systems of the vehicle 100 may include motors, engines, and/or propellers to generate thrust, lift, and/or directional force for the vehicle 100 (e.g., an aircraft); and flaps or other control surface to augment the thrust, lift, and/or directional force for the vehicle 100. The AFCS 110 may collect sensor data 50 from various sensors installed on the aircraft, and may also receive navigation and performance-related data from external systems via wired and/or wireless connection. The received data may be stored in one or more databases of the AFCS 110, such as the performance database 120 and the navigation database 130, depending on the data type. For example, aerodynamic and engine performance models of the airplane, maximum take-off weight, fuel weight and distribution models, CG models and CG thresholds, drag models, etc., may be stored in the performance database 120. The aerodynamic and engine performance models may include a flight envelope for maneuvers of the vehicle 100, and a prediction model, discussed in detail below. The information stored in the performance database 120 may be used to predict performance of the vehicle in a maneuver, such the transition maneuver 210.

The navigation database 130 may store information related to navigation or routing of the aircraft in a geographic area. In particular, the navigation database 130 may contain data elements that indicate restrictions on vehicle maneuvers, such as supersonic flight restrictions. The supersonic flight restrictions may indicate three-dimensional zones in which supersonic flight is not allowed or is allowed but in a limited manner. The information stored in the navigation database 130 may also include, for example, waypoints, airports, runways, airways, radio navigation aids, holding patterns, etc.

In one aspect of the disclosure, the AFCS 110 may perform a trigger process. The trigger process may include: obtaining a flight plan of a vehicle; monitoring progress of the vehicle through the flight plan to determine whether a transition between supersonic and subsonic flight is approaching; and in response to determining the transition between subsonic and supersonic flight is approaching, performing a supersonic flight entry/exit process.

To obtain a flight plan of a vehicle, the AFCS 110 may request a copy (or portion thereof) of the flight plan from the FMS 150. Moreover, the AFCS 110 may receive updates to the flight plan from the FMS 150, during the flight.

To monitor progress of the vehicle through the flight plan, the AFCS 110 may receive positioning data (e.g., GPS data, heading data, track data, etc.) from among the sensor data 50; and compare the positioning data to points of the planned flight path 205. For instance, the AFCS 110 may determine the positioning data indicates the vehicle 100 is a distance away (or time away) from a next point on the planned flight path 205.

To determine whether the transition between supersonic and subsonic flight is approaching, the AFCS 110 may determine whether the positioning data indicates the vehicle is within a threshold from a transition point from among the points of the planned flight path 205. As depicted in FIG. 2, at time t0, the AFCS 110 may determine the vehicle 100 is within a threshold distance or threshold time away from a transition point at waypoint w1. If the AFCS 110 determines the vehicle 100 is more than a threshold distance/time away from the transition point, the AFCS 110 may continue monitoring the progress of the vehicle through the flight plan. If the AFCS 110 determines the vehicle 100 is less than a threshold distance/time away from the transition point, the AFCS 110 may perform a supersonic flight entry/exit process. In this manner, the AFCS 110 may reduce processing power and/or processing time by avoiding executing the supersonic flight entry/exit process while far enough away from the transition point. For instance, if the AFCS 110 performed the supersonic flight entry/exit process at a great distance (e.g., 2000 miles) from the transition point, the analysis may not be accurate due to changed circumstances at the time of the transition point (e.g., due to weather conditions changing, fuel levels changing, performance characteristics changing, etc.).

To perform a supersonic flight entry/exit process, the AFCS 110 may invoke and execute a supersonic flight entry/exit program. The supersonic flight entry/exit process, in the supersonic flight entry/exit program, may include: obtaining center of gravity (CG) information for the vehicle 100, drag information for the vehicle 100, and a planned trajectory of the vehicle 100; performing an analysis of the CG information, the drag information, and the planned trajectory to determine whether the planned trajectory is safe and consistent; based on a result of the analysis, adjusting the planned trajectory or confirming the planned trajectory of the vehicle 100; and based on the adjusted planned trajectory or the confirmed planned trajectory of the vehicle 100, generating actuator instructions to execute the adjusted planned trajectory or the confirmed planned trajectory.

To obtain the CG information for the vehicle 100, the AFCS 110 may obtain CG information from another system (e.g., a fly by wire system) or generate the CG information based on the sensor data 50. For instance, to generate the CG information, the AFCS 110 may obtain and use a CG model from the performance database 120. The CG model may take as inputs fuel remaining and distribution (e.g., in various storage tanks) and attitude information (e.g., pitch, roll, and/or yaw, and rates thereof), and determine a CG location for the vehicle 100 based on a plurality of location, size, and weight for physical structures of the vehicle 100 and of the fuel in the storage tanks. A CG location may be a three-dimensional point based on a coordinate system with a defined center in or near the vehicle 100. The AFCS 110 may determine a current CG location (based on current data from the sensor data 50) and/or one or more predicted CG locations for points through a maneuver (based on expected data at the points). The CG information may include the current CG location (based on current data from the sensor data 50) and/or the one or more predicted CG locations for points through a maneuver.

To obtain the drag information for the vehicle 100, the AFCS 110 may obtain the drag information from another system (e.g., the fly by wire system) or generate the drag information based on the sensor data 50. For instance, to generate the drag information, the AFCS 110 may obtain and use a drag model from the performance database 120. The drag model may take as inputs external environment data (e.g., external air pressure, temperature, density, etc.), speed and attitude of the vehicle 110, and determine a drag force on the vehicle 100. The drag information may include the drag force determined by the drag model.

To obtain the planned trajectory of the vehicle 100, the AFCS 110 may obtain the transition maneuver 210 from the performance database 120 or from the FMS 150. The AFCS 110 may obtain the transition maneuver 210 from the performance database 120 by finding a maneuver in the performance database 120 with a same identifier as an identifier indicated on the flight plan for the transition point.

To perform the analysis of the CG information, the drag information, and the planned trajectory to determine whether the planned trajectory is safe and consistent, the AFCS 110 may use the prediction model to (1) determine an amount of space and/or time to execute the maneuver and (2) determine a starting point of the maneuver and an exit point of the maneuver in an acceptable location (to ensure safety/consistency); and compare the CG information to the CG thresholds to determine whether the CG location is within acceptable CG thresholds (to ensure safety).

The prediction mode may take as inputs a target flight path curve (e.g., a flight path curve of the transition maneuver 210), the flight envelope, external environment data (e.g., air pressure, wind, temperature, density, etc.), and the drag information. The AFCS 110 may use the prediction model to predict an amount of space and/or time to execute the maneuver to exit transonic flight to either of (1) supersonic flight or (2) subsonic flight. For instance, in order to ensure safety/consistency, the maneuver should be initiated at a point where the vehicle 100 has a capacity to perform a flight path angle curve at a defined rate of change and the vehicle 100 also has the appropriate thrust/drag to accelerate/decelerate through the transonic region in a defined time. By using the prediction model, the AFCP 110 may determine when it may be safe to perform the maneuver to result in consistent transitions through the transonic region. Specifically, the AFCP 110, using the prediction model, may predict the acceleration/deceleration of the vehicle 100 and a time response of a control system to achieve the defined flight path curve. For instance, the prediction model may have dynamic equations specific to the type of the vehicle 100 to predict a course (position with respect to time through maneuver) of the vehicle 100 through the maneuver, based on a state vector, possible control inputs to the actuation systems and associated outputs, external environmental data, and the drag information. The state vector may include position, velocity, acceleration, attitude (pitch, roll, yaw) and rates thereof for the vehicle 100. The possible control inputs may include inputs to control an elevator, throttle, aileron, rudder, etc. (referred to as "control system"), and the associated outputs may be what those control inputs would achieve, including the time response of the control system, such as an amount of thrust, a change in pitch, a change in roll, etc. of the vehicle 100. The AFCS 110 may obtain the state vector by obtaining relevant data from the sensor data 50, such as position and velocity from GPS data and attitude and rates thereof from one or more gyroscopes. The AFCP 110 may obtain the possible control inputs and the associated outputs from the performance database 120.

The AFCS 110 may determine a starting point of the maneuver and an exit point of the maneuver in an acceptable location, based on the predicted course (position with respect to time through maneuver) of the vehicle 100. The predicted course may indicate a time to complete the maneuver (e.g., thirty seconds to accelerate through transonic and achieve a target mach speed at supersonic flight) and a curve that the vehicle 100 is to proceed along to achieve the target altitude and speed. The curve may include a predicted starting point and a predicted ending point of the maneuver. The curve may indicate an amount of space to execute the maneuver, such as changes in altitude, latitude, and/or longitude from the predicted starting point to the predicted ending point.

To determine whether the planned trajectory has sufficient space, the AFCS 110 may compare the CG information to the CG thresholds. To compare the CG information to the CG thresholds, the AFCS 110 may determine a longitudinal CG component (e.g., forward or aft of the defined center) and/or a lateral CG component (e.g., left or right of the defined center) from the CG information for each the current CG location and/or the one or more predicted CG locations for points through a maneuver; and extract upper and lower longitudinal CG thresholds and upper and lower lateral CG thresholds from the CG thresholds. The AFCS 110 may then compare the determined longitudinal CG components to the upper and lower longitudinal CG thresholds to check that the determined longitudinal CG components are within the upper and lower longitudinal CG thresholds; and compare the determined lateral CG components to the upper and lower lateral CG thresholds to check that the determined lateral CG components are within the upper and lower lateral CG thresholds.

If the one of the longitudinal CG components or one of the lateral CG components are outside the upper and lower CG thresholds, the AFCS 110 may determine that the planned trajectory does not have sufficient space. If all of the longitudinal CG components the lateral CG components are within the upper and lower CG thresholds, the AFCS 110 may determine that the planned trajectory does have sufficient space. If the AFCS 110 determines the planned trajectory does not have sufficient space, the AFCS 110 may adjust the planned trajectory, as discussed below, and re-execute the analysis.

In one aspect of the disclosure, the upper and lower thresholds may be same or different for (1) when the transition is from subsonic to supersonic and (2) when the transition is from supersonic to subsonic. For instance, in the case of a supersonic-to-subsonic transition, the AFCS 110 may compare the CG information to a CG threshold (upper and lower) that allows recovery to subsonic given an available drag force of the drag information. In the case of a subsonic-to-supersonic transition, the AFCS 110 may compare the CG information to an allowable entry CG threshold; moreover, using the prediction model, the AFCS 110 may validate that there is enough acceleration available in engines of the vehicle 100 to achieve a target supersonic speed at the end of a transition maneuver.

To determine a starting point of the maneuver and an exit point of the maneuver in an acceptable location, the AFCS 110 may align the predicted starting point on the planned flight path 205 at the transition point to determine the exit point based on the curve and the predicted ending point. The AFCS 110 may then determine whether the determined exit point (or, generally, any points of the curve as aligned on the planned flight path 205) is within a supersonic flight restriction of the supersonic flight restrictions (extracted, in total or in part, from the navigation database 130). If the determined exit point is not within a supersonic flight restriction of the supersonic flight restrictions, the AFCS 110 may confirm the transition maneuver 210 as the planned trajectory.

If the determined exit point is within a supersonic flight restriction of the supersonic flight restrictions, the AFCS 110 may adjust the planned trajectory to an adjusted transition maneuver 215. For instance, if the supersonic flight restriction is a three-dimensional zone in which supersonic flight is not allowed, the AFCS 110 may adjust the starting position forward or backward along the planned flight path 205 to check the exit point against the supersonic flight restriction to ensure that the vehicle 100 avoids the supersonic flight restriction. If the supersonic flight restriction is a three-dimensional zone in which supersonic flight is allowed but in a limited manner (e.g., conditions for a maximum mach number and/or minimum floor altitude), the AFCS 110 may check that the conditions are satisfied; if the conditions are satisfied, the AFCS 110 may confirm the transition maneuver 210 as the planned trajectory; if the conditions are not satisfied, the AFCS 110 may adjust the starting position forward or backward along the planned flight path 205 to check the exit point against the supersonic flight restriction to ensure that the vehicle 100 avoids the supersonic flight restriction (and/or satisfies conditions).

In another aspect of the disclosure, instead of adjusting the starting position, the AFCS 110 may select a different one of the plurality of maneuvers as the adjusted transition maneuver 215, and re-execute the analysis. The AFCS 110 may select different maneuvers until one is acceptable, and confirm that acceptable maneuver as the confirmed trajectory.

To generate actuator instructions to execute the adjusted planned trajectory or the confirmed planned trajectory, the AFCS 110 may generate a plurality of control inputs to control the vehicle 100 through the confirmed or adjusted transition maneuver. For instance, the plurality of control inputs may adjust the throttle and control surfaces to execute the adjusted planned trajectory or the confirmed planned trajectory at specific times during the maneuver. The AFCS 110 may then execute the actuator instructions by controlling appropriate actuation systems of the vehicle 100, by e.g., transmitting the actuator instructions to various control inputs.

The AFCS 110 may notify the pilot/user of the vehicle 100 by a notice or alert on the display system 180, and/or audible notify the pilot/user (in the case of a user interface system). The notification may indicate that the AFCS 110 has confirmed a transition maneuver, and the notification may inform the pilot/user of the type of change (e.g., subsonic to supersonic or supersonic to subsonic). The AFCS 110 may also notify the pilot/user when the transition maneuver is being executed by the AFCS 110, such as at the start or continuously throughout the transition maneuver. The AFCS 110 may also notify the pilot/user when the vehicle 100 has exited transonic flight after the exit point.

Therefore, the AFCS 110 (a fly by wire system or, generally, a control system 105 of the present disclosure) may ensure that that vehicle 100 may safely and consistently exit transonic flight to supersonic flight and subsonic flight. For instance, the AFCS 110 may check CG locations to CG thresholds to ensure the vehicle 100 has sufficient space to execute the maneuver. Additionally, the AFCS 110 may check a predicted exit point (or, generally, any point of a predicted curve) of the maneuver to ensure that it does not intersect a supersonic flight restriction; and if it does, the AFCS 110 may adjust the maneuver to avoid the supersonic flight restriction. Therefore, the AFCS 110 of the present disclosure may (1) determine suitable entry and exit locations into and out of transonic flight to or from supersonic flight and (2) ensure that execution of transition maneuvers into or out of supersonic flight occurs with sufficient space.

Figure 3A:
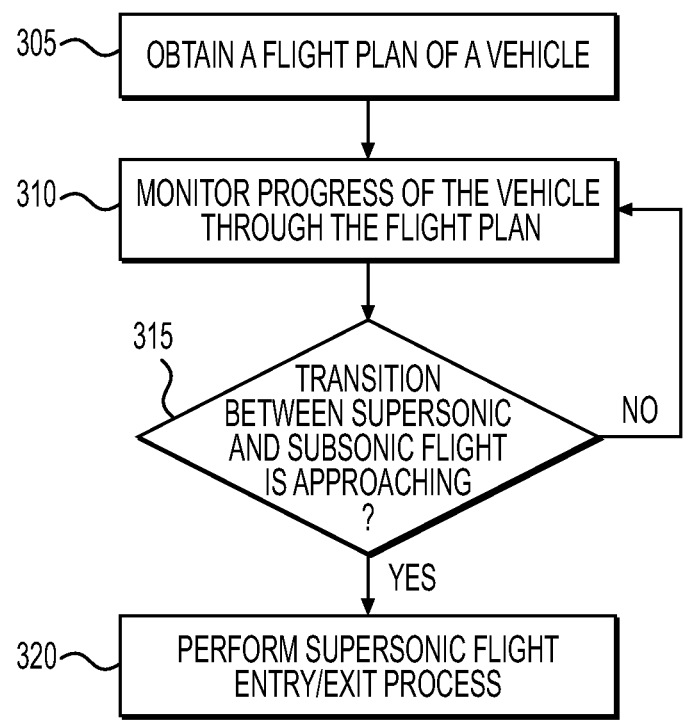
FIGS. 3A and 3B, respectfully, depict flowcharts for a supersonic entry/exit monitor, according to one or more embodiments.
Figure 3B:
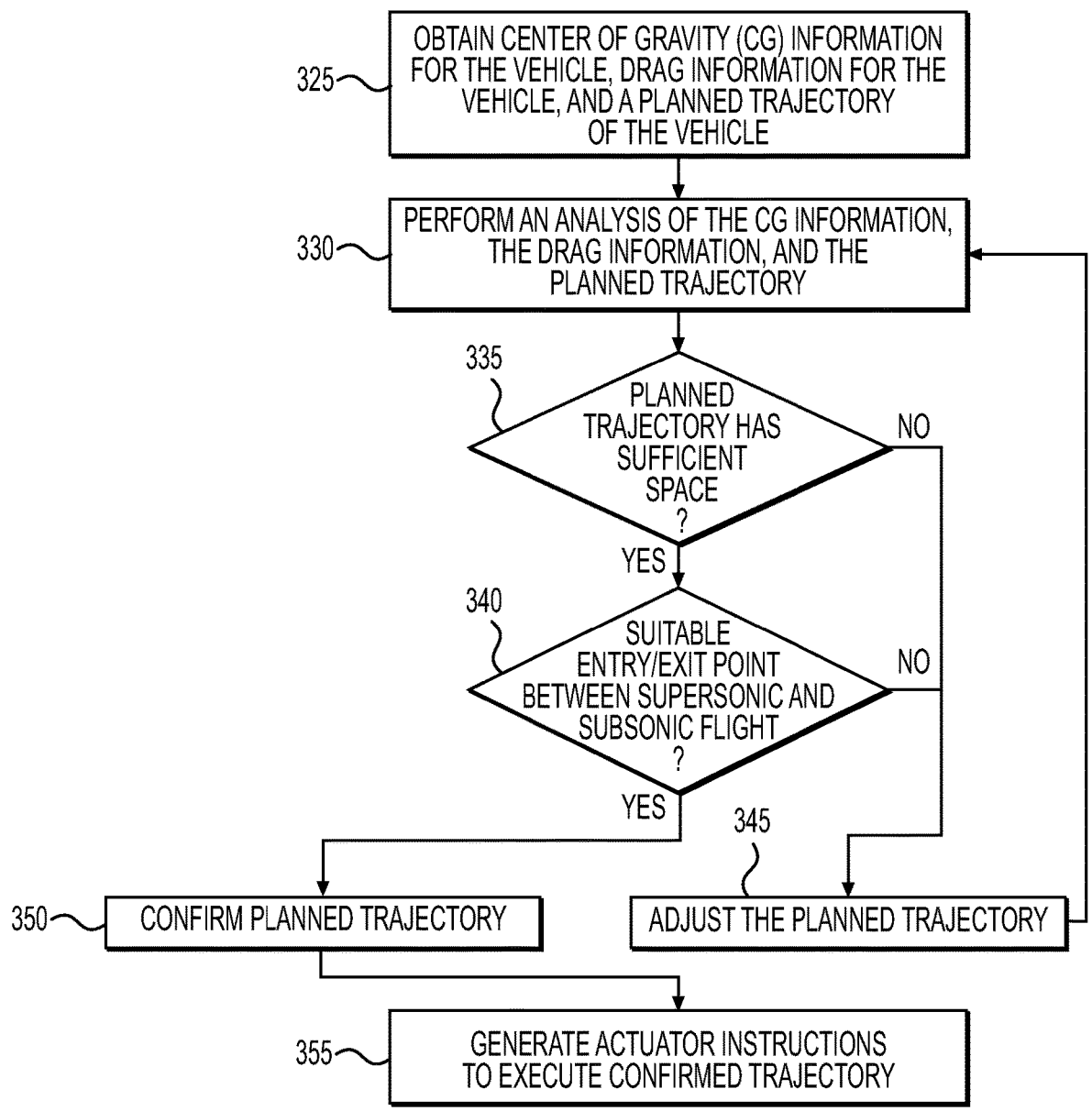

FIGS. 3A and 3B, respectfully, depict flowcharts for a supersonic entry/exit monitor, according to one or more embodiments. Flowchart 300A of FIG. 3A may depict a trigger process, while flowchart 300B of FIG. 3B may depict a supersonic flight entry/exit process. The processes of the flowcharts 300A and 300B may be performed by the AFCS 110.

The AFCS 110 may start the process of flowchart 300A to obtain a flight plan of a vehicle (block 305). For instance, the AFCS 110 may receive the flight plan (or updates thereto) from the FMS 150, as discussed above with respect to FIG. 1.

The AFCS 110 may continue the process to monitor a progress of the vehicle through the flight plan (bock 310). For instance, the AFCS 110 may compare the positioning data to points of the planned flight path 205, as discussed above with respect to FIG. 1.

The AFCS 110 may continue the process to determine whether a transition between supersonic and subsonic flight is approaching (bock 310). For instance, the AFCS 110 may determine whether the vehicle 100 is within a threshold from a transition point from among the points of the planned flight path 205, as discussed above with respect to FIG. 1.

In response to determining a transition between supersonic and subsonic flight is not approaching (block 315: No), the AFCS 110 may return to monitor the progress of the vehicle through the flight plan (bock 310).

In response to determining a transition between supersonic and subsonic flight is approaching (block 315: Yes), the AFCS 110 may perform the supersonic flight entry/exit process (block 320). For instance, the AFCS 110 may invoke the supersonic flight entry/exit process, as discussed above with respect to FIG. 1.

The AFCS 110 may start the process of flowchart 300B to obtain center of gravity (CG) information for the vehicle, drag information for the vehicle, and a planned trajectory of the vehicle (block 325). For instance, the AFCS 110 may obtain the CG model and the drag model from the performance database 120, and determine the CG information and the drag information, as discussed above with respect to FIG. 1.

The AFCS 110 may continue the process to perform an analysis of the CG information, the drag information, and the planned trajectory (bock 330). For instance, the AFCS 110 may obtain the prediction model from the performance database 120 and use the prediction model to predict a course (position with respect to time through maneuver) of the vehicle 100 through the maneuver, as discussed above with respect to FIG. 1.

The AFCS 110 may continue the process to determine whether the planned trajectory has sufficient space (bock 335). For instance, the AFCS 110 may compare the CG information to the CG thresholds, as discussed above with respect to FIG. 1.

In response to determining the planned trajectory has sufficient space (block 335: Yes), the AFCS 110 may continue the process to determine whether the planned trajectory has a suitable entry/exit point between supersonic and subsonic flight (bock 340). For instance, the AFCS 110 may compare the exit point with three-dimensional volumes associated with supersonic restrictions, as discussed above with respect to FIG. 1.

In response to determining the planned trajectory does not have sufficient space and/or in response to the determining the planned trajectory does not have a suitable entry/exit point between supersonic and subsonic flight (blocks 335/340: No), the AFCS 110 may adjust the planned trajectory (block 345). The AFCS 110 may continue the process to perform the analysis of the CG information, the drag information, and the adjusted planned trajectory (bock 330).

In response to determining the planned trajectory has a suitable entry/exit point between supersonic and subsonic flight (blocks 340: Yes), the AFCS 110 may confirm the planned (or adjusted, if the planned trajectory has been adjusted) trajectory (block 350).

The AFCS 110 may continue the process to generate actuator instructions to execute the confirmed trajectory (bock 355). For instance, the AFCS 110 may generate a plurality of control inputs to control the vehicle 100 through the confirmed or adjusted transition maneuver, as discussed above with respect to FIG. 1.

One of skill in the art would understand that the determinations of (1) whether the planned trajectory has sufficient space and (2) whether the planned trajectory has a suitable entry/exit point between supersonic and subsonic flight, may be determined in various manners. For instance, (1) and (2) may be determined in sequence, as depicted in FIG. 3B; in reverse conditional sequence (i.e., (2) is checked first, then (1) is checked); or in parallel.

Figure 4:
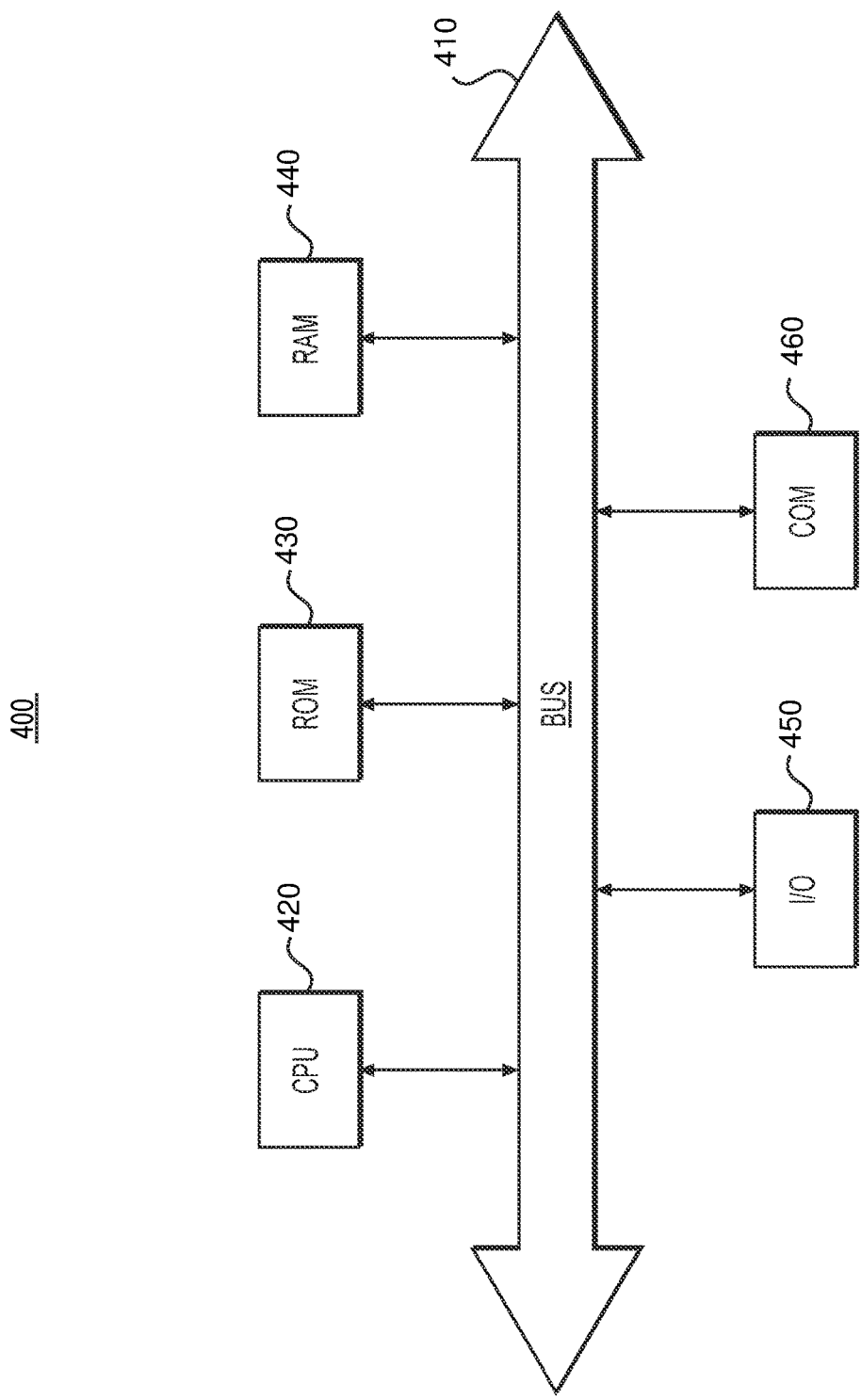
FIG. 4 depicts an example system that may execute techniques presented herein.

FIG. 4 depicts an example system that may execute techniques presented herein. FIG. 4 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling supersonic flight entry/exit of a vehicle, the method comprising:
    obtaining a flight plan of a vehicle;
    monitoring progress of the vehicle through the flight plan to determine whether a transition between supersonic and subsonic flight is approaching; and
    in response to determining the transition between subsonic and supersonic flight is approaching, obtaining center of gravity (CG) information for the vehicle and a planned trajectory of the vehicle;
    determining, based on the CG information and the planned trajectory, a suitable entry/exit point between supersonic and subsonic flight;
    based on a result of the determination, adjusting the planned trajectory or confirming the planned trajectory of the vehicle; and
    based on the adjusted planned trajectory or the confirmed planned trajectory of the vehicle, generating actuator instructions to execute the adjusted planned trajectory or the confirmed planned trajectory.

2. The method of claim 1, wherein the obtaining CG information for the vehicle includes:
    obtaining a CG model from a database of the vehicle;
    obtaining sensor data from other vehicle systems; and
    generating the CG information based on the CG model and the sensor data, the CG information including a current CG location and/or one or more predicted CG locations for points through a maneuver corresponding to the planned trajectory.

3. The method of claim 2, further comprising:
    obtaining drag information for the vehicle, including:
        obtaining a drag model from a database of the vehicle;
        obtaining sensor data from other vehicle systems;
        generating the drag information based on the drag model and the sensor data, the drag information including a drag force on the vehicle; and determining the suitable entry/exit point between supersonic and subsonic flight further based on the drag information.

4. The method of claim 3, wherein the determining, based on the CG information, the drag information, and the planned trajectory, the suitable entry/exit point between supersonic and subsonic flight includes:
obtaining a prediction model from a database of the vehicle; and
using the prediction model, predicting a course of the vehicle through the maneuver corresponding to the planned trajectory.

5. The method of claim 4, wherein the prediction model includes dynamic equations to predict the course, based on a state vector of the vehicle, possible control inputs to actuation systems of the vehicle and associated outputs, external environmental data from sensor data, and the drag information.

6. The method of claim 5, wherein determining, based on the CG information, the drag information, and the planned trajectory, the suitable entry/exit point between supersonic and subsonic flight further includes:
comparing the CG information to CG thresholds by:
determining a longitudinal CG components and/or a lateral CG components from the CG information for each of the current CG location and/or the one or more predicted CG locations for the points; and
comparing the longitudinal CG components and the lateral CG component to the CG thresholds;
in response to all of the longitudinal CG components and all of the lateral CG components are inside the CG thresholds, determining the planned trajectory has sufficient space;
in response to determining the planned trajectory has sufficient space, confirming the planned trajectory of the vehicle, unless there is no suitable entry/exit point between supersonic and subsonic flight;
in response to one of the longitudinal CG components or one of the lateral CG components are outside the CG thresholds, determining the planned trajectory does not have sufficient space; and
in response to determining the planned trajectory does not have sufficient space, adjusting the planned trajectory of the vehicle.

7. The method of claim 5,
wherein the course indicates a curve for the vehicle to follow to execute the planned trajectory,
wherein the curve includes a predicted starting point and a predicted ending point of the maneuver; and
wherein, to determine the suitable entry/exit point between supersonic and subsonic flight, the method further includes:
aligning the predicted starting point on a planned flight path at a transition point;
determining an exit point based on the curve and the predicted ending point;
determining whether the determined exit point is within a supersonic flight restriction;
in response to determining the determined exit point is not within a supersonic flight restriction, determining the transition point and the exit point are suitable entry/exit points;
in response to determining the transition point and the exit point are suitable entry/exit points, confirming the planned trajectory of the vehicle, unless the planned trajectory does not have sufficient space;
in response to determining the determined exit point is within a supersonic flight restriction, checking conditions of the supersonic flight restriction;
in response to the conditions of the supersonic flight restriction being satisfied, confirming the planned trajectory of the vehicle, unless the planned trajectory does not have sufficient space; and
in response to the conditions of the supersonic flight restriction not being satisfied, adjusting the planned trajectory of the vehicle and re-executing the analysis.

8. A system for controlling supersonic flight entry/exit of a vehicle, the system comprising:
a memory storing instructions; and
a processor executing the instructions to perform a process including:
obtaining a flight plan of a vehicle;
monitoring progress of the vehicle through the flight plan to determine whether a transition between supersonic and subsonic flight is approaching; and
in response to determining the transition between subsonic and supersonic flight is approaching, obtaining center of gravity (CG) information for the vehicle and a planned trajectory of the vehicle;
determining, based on the CG information and the planned trajectory, a suitable entry/exit point between supersonic and subsonic flight;
based on a result of the determination, adjusting the planned trajectory or confirming the planned trajectory of the vehicle; and
based on the adjusted planned trajectory or the confirmed planned trajectory of the vehicle, generating actuator instructions to execute the adjusted planned trajectory or the confirmed planned trajectory.

9. The system of claim 8, wherein the supersonic flight entry/exit process further includes, to obtain the CG information for the vehicle:
obtaining a CG model from a database of the vehicle;
obtaining sensor data from other vehicle systems; and
generating the CG information based on the CG model and the sensor data, the CG information including a current CG location and/or one or more predicted CG locations for points through a maneuver corresponding to the planned trajectory.

10. The system of claim 9, further comprising obtaining drag information for the vehicle including:
obtaining a drag model from a database of the vehicle;
obtaining sensor data from other vehicle systems; and
generating the drag information based on the drag model and the sensor data, the drag information including a drag force on the vehicle; and
wherein the determining the suitable entry/exit point between supersonic and subsonic flight further comprises determining, based on the CG information, the drag information, and the planned trajectory, the suitable entry/exit point between supersonic and subsonic flight.

11. The system of claim 10, wherein the determining, based on the CG information, the drag information, and the planned trajectory, the suitable entry/exit point between supersonic and subsonic flight, further includes:
obtaining a prediction model from a database of the vehicle; and
using the prediction model, predicting a course of the vehicle through the maneuver corresponding to the planned trajectory.

12. The system of claim 11, wherein the prediction model includes dynamic equations to predict the course, based on a state vector of the vehicle, possible control inputs to actuation systems of the vehicle and associated outputs, external environmental data from sensor data, and the drag information.

13. The system of claim 12, wherein determining, based on the CG information, the drag information, and the planned trajectory, the suitable entry/exit point between supersonic and subsonic flight further includes:
comparing the CG information to CG thresholds by:
determining a longitudinal CG components and/or a lateral CG components from the CG information for each of the current CG location and/or the one or more predicted CG locations for the points; and
comparing the longitudinal CG components and the lateral CG component to the CG thresholds;
in response to all of the longitudinal CG components and all of the lateral CG components are inside the CG thresholds, determining the planned trajectory has sufficient space;
in response to determining the planned trajectory has sufficient space, confirming the planned trajectory of the vehicle, unless there is no suitable entry/exit point between supersonic and subsonic flight;
in response to one of the longitudinal CG components or one of the lateral CG components are outside the CG thresholds, determining the planned trajectory does not have sufficient space; and
in response to determining the planned trajectory does not have sufficient space, adjusting the planned trajectory of the vehicle.

14. The system of claim 12, wherein the course indicates a curve for the vehicle to follow to execute the planned trajectory,
wherein the curve includes a predicted starting point and a predicted ending point of the maneuver; and
wherein the supersonic flight entry/exit process further includes, to determine the suitable entry/exit point between supersonic and subsonic flight:
aligning the predicted starting point on a planned flight path at a transition point;
determining an exit point based on the curve and the predicted ending point;
determining whether the determined exit point is within a supersonic flight restriction;
in response to determining the determined exit point is not within a supersonic flight restriction, determining the transition point and the exit point are suitable entry/exit points;
in response to determining the transition point and the exit point are suitable entry/exit points, confirming the planned trajectory of the vehicle, unless the planned trajectory does not have sufficient space;
in response to determining the determined exit point is within a supersonic flight restriction, checking conditions of the supersonic flight restriction;
in response to the conditions of the supersonic flight restriction being satisfied, confirming the planned trajectory of the vehicle, unless the planned trajectory does not have sufficient space; and
in response to the conditions of the supersonic flight restriction not being satisfied, adjusting the planned trajectory of the vehicle and re-executing the analysis.

15. A non-transitory computer-readable medium storing instructions that, when executed by a processor, cause the processor to perform a method for controlling supersonic flight entry/exit of a vehicle, the method comprising:
obtaining a flight plan of a vehicle;
monitoring progress of the vehicle through the flight plan to determine whether a transition between supersonic and subsonic flight is approaching; and
in response to determining the transition between subsonic and supersonic flight is approaching, obtaining center of gravity (CG) information for the vehicle and a planned trajectory of the vehicle;
determining, based on the CG information and the planned trajectory, whether the planned trajectory has sufficient space and determine a suitable entry/exit point between supersonic and subsonic flight;
based on a result of the determination, adjusting the planned trajectory or confirming the planned trajectory of the vehicle; and
based on the adjusted planned trajectory or the confirmed planned trajectory of the vehicle, generating actuator instructions to execute the adjusted planned trajectory or the confirmed planned trajectory.

16. The non-transitory computer-readable medium of claim 15, wherein the obtaining CG information for the vehicle includes:
obtaining a CG model from a database of the vehicle;
obtaining sensor data from other vehicle systems; and
generating the CG information based on the CG model and the sensor data, the CG information including a current CG location and/or one or more predicted CG locations for points through a maneuver corresponding to the planned trajectory.

17. The non-transitory computer-readable medium of claim 16, wherein the determining, based on the CG information, the drag information, and the planned trajectory, the suitable entry/exit point between supersonic and subsonic flight, further includes:
obtaining a prediction model from a database of the vehicle; and
using the prediction model, predicting a course of the vehicle through the maneuver corresponding to the planned trajectory.

18. The non-transitory computer-readable medium of claim 17, wherein the prediction model includes dynamic equations to predict the course, based on a state vector of the vehicle, possible control inputs to actuation systems of the vehicle and associated outputs, external environmental data from sensor data, and the drag information.

19. The non-transitory computer-readable medium of claim 18, wherein determining, based on the CG information, the drag information, and the planned trajectory, the suitable entry/exit point between supersonic and subsonic flight further includes:
comparing the CG information to CG thresholds by:
determining a longitudinal CG components and/or a lateral CG components from the CG information for each of the current CG location and/or the one or more predicted CG locations for the points; and
comparing the longitudinal CG components and the lateral CG component to the CG thresholds;
in response to all of the longitudinal CG components and all of the lateral CG components are inside the CG thresholds, determining the planned trajectory has sufficient space;
in response to determining the planned trajectory has sufficient space, confirming the planned trajectory of the vehicle, unless there is no suitable entry/exit point between supersonic and subsonic flight;

in response to one of the longitudinal CG components or one of the lateral CG components are outside the CG thresholds, determining the planned trajectory does not have sufficient space; and in response to determining the planned trajectory does not have sufficient space, adjusting the planned trajectory of the vehicle and re-executing the analysis.

20. The non-transitory computer-readable medium of claim 18, wherein the course indicates a curve for the vehicle to follow to execute the planned trajectory, wherein the curve includes a predicted starting point and a predicted ending point of the maneuver; and wherein, to determine the suitable entry/exit point between supersonic and subsonic flight, the method further includes:

aligning the predicted starting point on a planned flight path at a transition point;

determining an exit point based on the curve and the predicted ending point;

determining whether the determined exit point is within a supersonic flight restriction;

in response to determining the determined exit point is not within a supersonic flight restriction, determining the transition point and the exit point are suitable entry/exit points;

in response to determining the transition point and the exit point are suitable entry/exit points, confirming the planned trajectory of the vehicle, unless the planned trajectory does not have sufficient space;

in response to determining the determined exit point is within a supersonic flight restriction, checking conditions of the supersonic flight restriction;

in response to the conditions of the supersonic flight restriction being satisfied, confirming the planned trajectory of the vehicle, unless the planned trajectory does not have sufficient space; and in response to the conditions of the supersonic flight restriction not being satisfied, adjusting the planned trajectory of the vehicle and re-executing the analysis.

* * * * *